(12) United States Patent
Baker-Ostiguy

(10) Patent No.: US 11,719,243 B2
(45) Date of Patent: Aug. 8, 2023

(54) IMPELLER ROTOR CONFIGURED WITH WEAR RESISTANT SEAL LAND

(71) Applicant: Pratt & Whitney Canada Corp., Longueuil (CA)

(72) Inventor: Simon Baker-Ostiguy, Montreal (CA)

(73) Assignee: Pratt & Whitney Canada Corp., Longueuil (CA)

( * ) Notice: Subject to any disclaimer, the term of this patent is extended or adjusted under 35 U.S.C. 154(b) by 9 days.

(21) Appl. No.: 17/395,850

(22) Filed: Aug. 6, 2021

(65) Prior Publication Data

US 2023/0044553 A1 Feb. 9, 2023

(51) Int. Cl.
| | |
|---|---|
| *F04D 29/12* | (2006.01) |
| *F04D 9/00* | (2006.01) |
| *F04D 29/08* | (2006.01) |
| *F04D 29/20* | (2006.01) |
| *F04D 29/22* | (2006.01) |
| *F04D 31/00* | (2006.01) |
| *F16J 15/3212* | (2016.01) |

(52) U.S. Cl.
CPC ........... *F04D 9/003* (2013.01); *F04D 29/086* (2013.01); *F04D 29/12* (2013.01); *F04D 29/20* (2013.01); *F04D 29/2288* (2013.01); *F04D 31/00* (2013.01); *F05D 2240/55* (2013.01); *F05D 2240/61* (2013.01); *F05D 2260/609* (2013.01); *F05D 2300/171* (2013.01); *F05D 2300/173* (2013.01); *F16J 15/3212* (2013.01)

(58) Field of Classification Search
CPC ...... F04D 29/12; F04D 29/20; F04D 29/2288; F05D 2260/609; F16J 15/3452; F16J 15/3208; F16J 1615/3212; F16J 125/18; F01D 25/183; F01D 25/20; F01D 25/186
See application file for complete search history.

(56) References Cited

U.S. PATENT DOCUMENTS

| | | | |
|---|---|---|---|
| 2,296,701 A | 9/1942 | Butler | |
| 3,601,417 A * | 8/1971 | Szepesvary | F16J 15/3208 277/572 |
| 3,921,992 A * | 11/1975 | Bertin | F16J 15/3208 277/560 |
| 4,217,120 A | 8/1980 | Reynolds | |
| 4,569,638 A | 2/1986 | Harker | |

(Continued)

FOREIGN PATENT DOCUMENTS

| | | |
|---|---|---|
| FR | 3090035 B1 | 2/2021 |
| GB | 2532197 B | 5/2019 |

OTHER PUBLICATIONS

EP search report for EP22188262.4 dated Jan. 23, 2023.

*Primary Examiner* — Eldon T Brockman
(74) *Attorney, Agent, or Firm* — Getz Balich LLC

(57) ABSTRACT

An assembly is provided for a turbine engine. This turbine engine assembly includes an impeller rotor, a seal land and a lip seal. The impeller rotor is configured to rotate about a rotational axis. The impeller rotor is configured from or otherwise includes impeller rotor material. The seal land extends axially along and circumferentially about the rotational axis. The seal land is mechanically attached to and rotatable with the impeller rotor. The seal land is configured from or otherwise includes seal land material that is different than the impeller rotor material. The lip seal radially engages the seal land.

16 Claims, 6 Drawing Sheets

(56) References Cited

U.S. PATENT DOCUMENTS

| | | | |
|---|---|---|---|
| 4,798,320 A * | 1/1989 | Fang | F01D 5/025 |
| | | | 228/124.1 |
| 7,252,474 B2 | 8/2007 | Belokon | |
| 7,377,110 B2 | 5/2008 | Sheridan | |
| 7,909,578 B2 * | 3/2011 | Nishiyama | F01D 5/025 |
| | | | 416/204 A |
| 8,985,277 B2 | 3/2015 | Hetherington | |
| 2007/0292268 A1 * | 12/2007 | Nishiyama | F04D 29/266 |
| | | | 415/230 |
| 2015/0176492 A1 | 6/2015 | Cutrara | |
| 2016/0097293 A1 | 4/2016 | Svihla | |
| 2017/0234398 A1 * | 8/2017 | Kamiya | F16F 15/1442 |
| | | | 277/562 |
| 2019/0338705 A1 | 11/2019 | Reid | |
| 2021/0254628 A1 * | 8/2021 | Stoyanov | F04D 29/12 |

\* cited by examiner

IMPELLER ROTOR CONFIGURED WITH WEAR RESISTANT SEAL LAND

BACKGROUND OF THE DISCLOSURE

1. Technical Field

This disclosure relates generally to rotational equipment and, more particularly, to a rotational equipment device with an impeller.

2. Background Information

Rotational equipment such as a gas turbine engine may include a deaerator for separating a fluid into its liquid and gas components. Various types and configurations of deaerators are known in the art. While these known deaerators have various benefits, there is still room in the art for improvement. For example, there is a need for a light-weight, wear resistant rotor assembly for a deaerator.

SUMMARY OF THE DISCLOSURE

According to an aspect of the present disclosure, an assembly is provided for a turbine engine. This turbine engine assembly includes an impeller rotor, a seal land and a lip seal. The impeller rotor is configured to rotate about a rotational axis. The impeller rotor is configured from or otherwise includes impeller rotor material. The seal land extends axially along and circumferentially about the rotational axis. The seal land is mechanically attached to and rotatable with the impeller rotor. The seal land is configured from or otherwise includes seal land material that is different than the impeller rotor material. The lip seal radially engages the seal land.

According to another aspect of the present disclosure, another assembly is provided for a turbine engine. This turbine engine assembly includes an impeller rotor, a seal land and a lip seal. The impeller rotor is configured to rotate about a rotational axis. The impeller rotor is configured from or otherwise includes impeller rotor material. The seal land is rotatable with and projects axially along the rotational axis out from the impeller rotor. The seal land is configured from or otherwise includes seal land material that is different than the impeller rotor material. The lip seal radially engages the impeller rotor material.

According to still another aspect of the present disclosure, another assembly is provided for a turbine engine. This turbine engine assembly includes a deaerator impeller rotor, a seal land and a stationary seal element. The deaerator impeller rotor is configured to rotate about a rotational axis. The deaerator impeller rotor is configured from or otherwise includes impeller rotor material. The seal land extends axially along and circumferentially about the rotational axis. The seal land is mechanically attached to and rotatable with the deaerator impeller rotor. The seal land is configured from or otherwise includes seal land material that is different than the impeller rotor material. The stationary seal element radially contacts the seal land.

The seal land may include a base and a hard coating on the base. The base may be formed integrally with the impeller rotor. The hard coating may be configured from or otherwise include the seal land material.

The seal land may project into a bore of and may be mechanically attached to the impeller rotor.

The impeller rotor material may be configured from or otherwise include aluminum.

The seal land material may be configured from or otherwise include steel.

The impeller rotor may be configured as a deaerator impeller rotor.

The lip seal may include a seal base and a seal leg. The seal leg may be axially cantilevered from the seal base. The seal leg may include a tip that radially contacts an outer surface of the seal land.

The lip seal may also include a biasing element extending circumferentially about and radially engaging the seal leg. The biasing element may be configured to bias the seal leg radially inward against the outer surface of the seal land.

The assembly may include a ring seal element configured to form a sealed interface with and between the impeller rotor and the seal land.

The seal land may engage the impeller rotor through an interference fit.

A rotor bore may extend axially along the rotational axis into the impeller rotor. The seal land may include a mount that projects axially along the rotational axis into the rotor bore. The mount may be mechanically attached to the impeller rotor.

The mount may be axially clamped to the impeller rotor.

A fastener may rotationally fix the mount to the impeller rotor.

The assembly may also include a shaft mechanically attached to and rotatable with the impeller rotor.

The shaft may be configured from or otherwise include shaft material that is different than the seal land material.

The impeller rotor may extend axially along the rotational axis between a first side of the impeller rotor and a second side of the impeller rotor. The seal land may be arranged to the first side of the impeller rotor. The shaft may be arranged to the second side of the impeller rotor.

At least the seal land and the shaft may be formed together as a monolithic body.

The assembly may also include a static structure and a bearing rotatably supporting the shaft within the static structure. The lip seal may be fixedly secured to the static structure.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
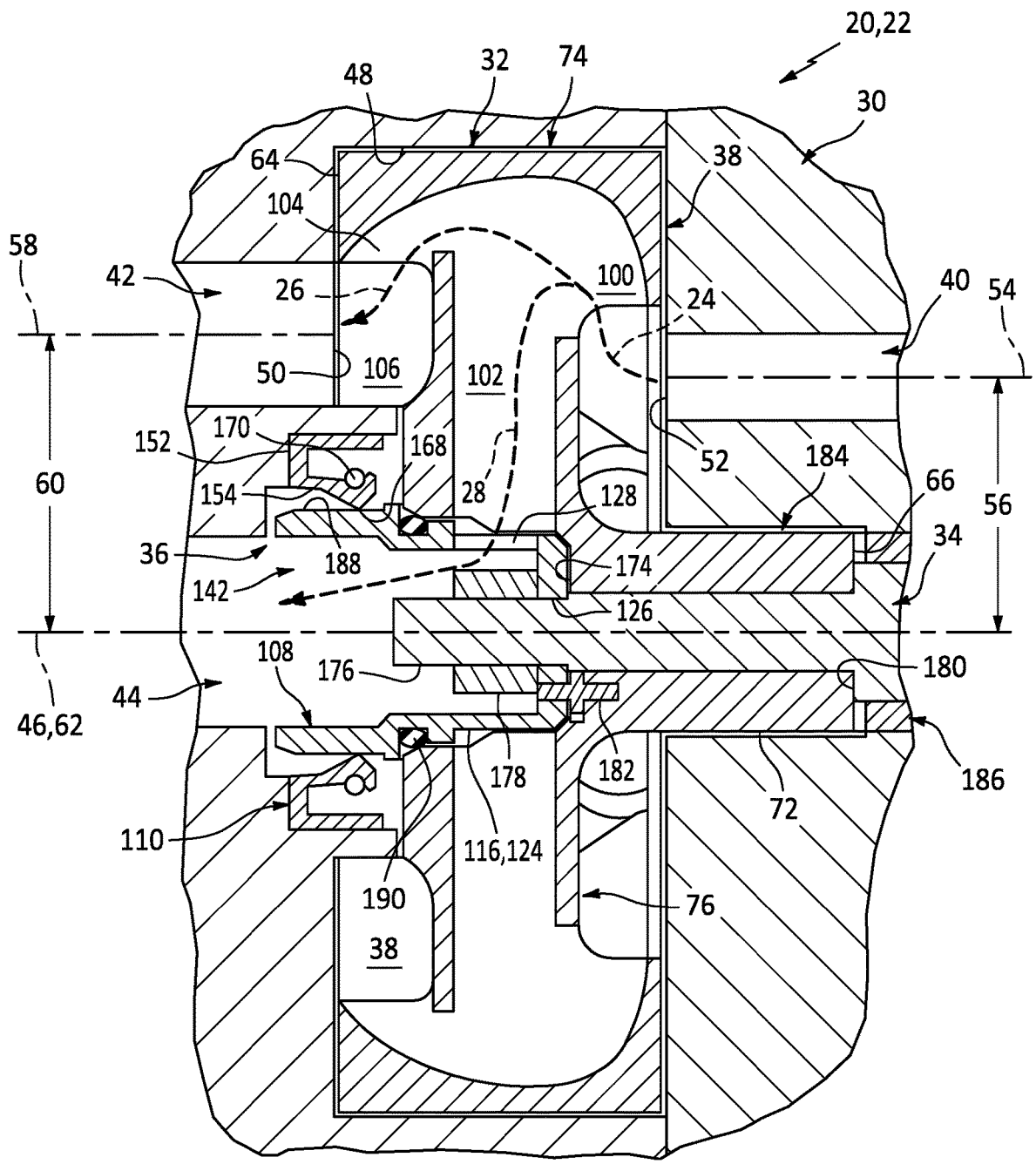
FIG. 1 is a side sectional illustration of a portion of an assembly for a turbine engine.

FIG. 1 illustrates an assembly 20 for a gas turbine engine. This turbine engine assembly 20 of FIG. 1 forms a deaerator 22 for the turbine engine. This deaerator 22 is configured to separate a fluid flow 24 with a liquid component and a gas component substantially into a separate liquid component flow 26 and a separate gas component flow 28. The deaerator 22 may therefore also be referred to as a liquid-gas separator; e.g., a lubricant-air separator (also referred to as a de-oiler) where the liquid component is or otherwise includes lubricant (e.g., oil) and where the gas component is or otherwise includes air. The assembly 20/the deaerator 22 of FIG. 1 includes a static structure 30, a deaerator impeller rotor 32 and a shaft 34. The deaerator 22 of FIG. 1 also includes a seal assembly 36.

The static structure 30 may be configured as a dedicated housing for the deaerator components 32, 34 and 36; e.g., a deaerator case. The static structure 30 may alternatively be configured to support and/or house one or more other components of the turbine engine in addition to housing the deaerator components 32, 34 and 36. The static structure 30 of FIG. 1 includes an impeller rotor cavity 38, a fluid inlet passage 40, a liquid outlet passage 42 and a gas outlet passage 44.

The rotor cavity 38 extends radially out from a rotational axis 46 (e.g., a centerline) of the deaerator 22 within the static structure 30 to an outer side 48 of the rotor cavity 38. The rotor cavity 38 extends (e.g., completely) circumferentially around the rotational axis 46. The rotor cavity 38 extends axially along the rotational axis 46 within the static structure 30 between and to a first side 50 of the rotor cavity 38 and a second side 52 of the rotor cavity 38.

The fluid inlet passage 40 extends axially along the rotational axis 46 within and/or into the static structure 30 to the rotor cavity 38. An outlet of the fluid inlet passage 40 is fluidly coupled with the rotor cavity 38. The fluid inlet passage 40 is located to the rotor cavity second side 52. A centerline 54 of the fluid inlet passage 40 of FIG. 1 (e.g., at the outlet of the fluid inlet passage 40) is radially offset from the rotational axis 46 by a radial distance 56. While the fluid inlet passage centerline 54 is shown in FIG. 1 as parallel with the rotational axis 46, the present disclosure is not limited to such an exemplary arrangement. For example, in other embodiments, the fluid inlet passage centerline 54 and, thus, the fluid inlet passage 40 may be angularly offset from the rotational axis 46 and/or angularly offset from the rotor cavity second side 52 by an acute or an obtuse angle.

The liquid outlet passage 42 extends axially along the rotational axis 46 within and/or into the static structure 30 to the rotor cavity 38. An inlet to the liquid outlet passage 42 is fluidly coupled with the rotor cavity 38. The liquid outlet passage 42 is located to the rotor cavity first side 50. A centerline 58 of the liquid outlet passage 42 of FIG. 1 (e.g., at the inlet to the liquid outlet passage 42) is radially offset from the rotational axis 46 by a radial distance 60. This distance 60 may be greater than the distance 56. While the liquid outlet passage centerline 58 is shown in FIG. 1 as parallel with the rotational axis 46, the present disclosure is not limited to such an exemplary arrangement. For example, in other embodiments, the liquid outlet passage centerline 58 and, thus, the liquid outlet passage 42 may be angularly offset from the rotational axis 46 and/or angularly offset from the rotor cavity first side 50 by an acute or an obtuse angle.

The gas outlet passage 44 extends axially along the rotational axis 46 within and/or into the static structure 30 to the rotor cavity 38. An inlet to the gas outlet passage 44 is fluidly coupled with the rotor cavity 38. The gas outlet passage 44 is located to the rotor cavity first side 50. A centerline 62 of the gas outlet passage 44 of FIG. 1 may be aligned (e.g., coaxial) with the rotational axis 46. With this arrangement, the gas outlet passage 44 is positioned radially inward of the liquid outlet passage 42, and the fluid inlet passage 40 is generally aligned radially between the outlet passages 42 and 44.

Figure 2:
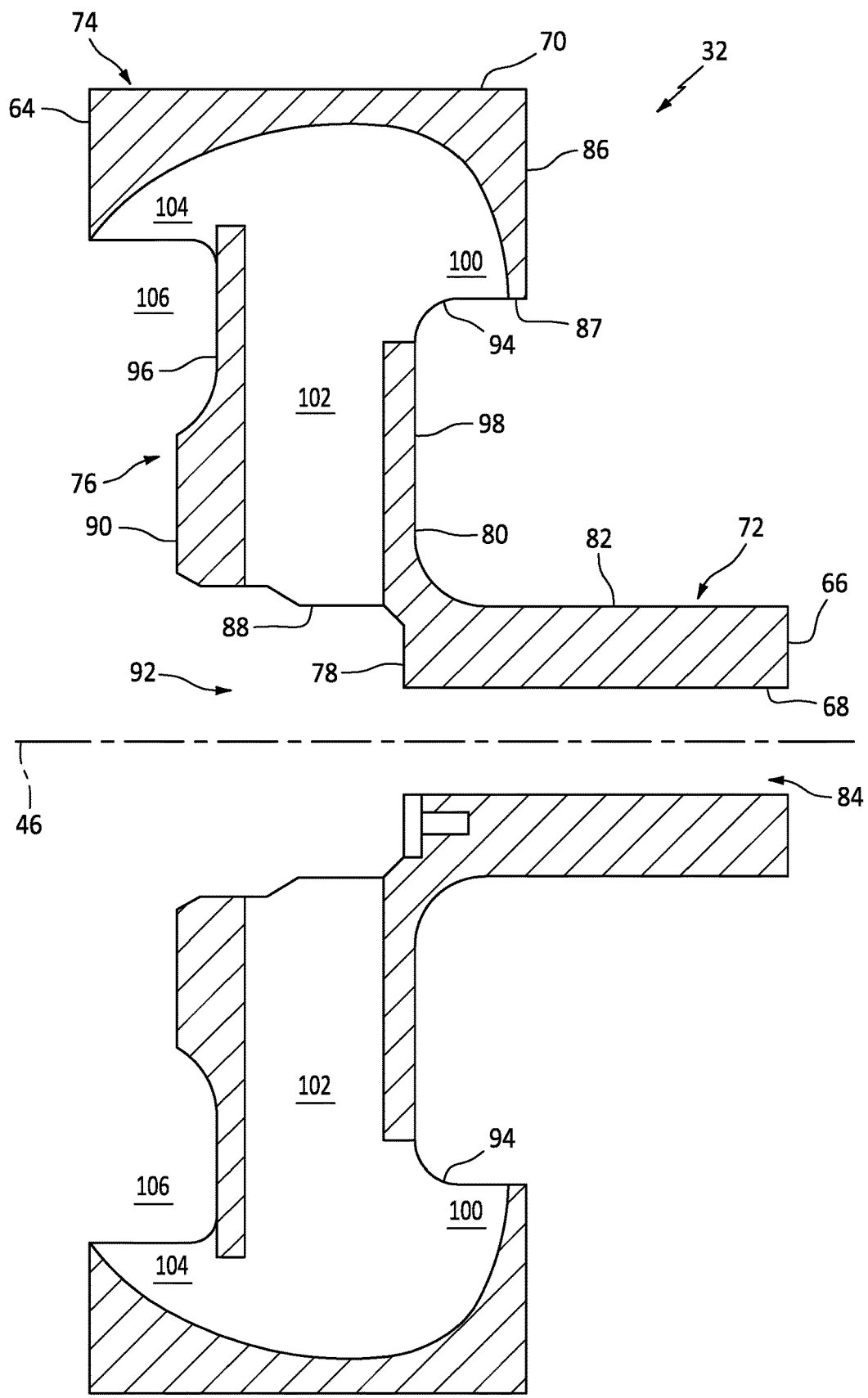
FIG. 2 is a side sectional illustration of an impeller rotor.

The impeller rotor 32 of FIG. 2 is rotatable about the rotational axis 46. The impeller rotor 32 extends axially along the rotational axis 46 between and to a first side 64 of the impeller rotor 32 and a second side 66 of the impeller rotor 32. The impeller rotor 32 extends (e.g., completely) circumferentially around the rotational axis 46 providing the impeller rotor 32 with a full-hoop body. The impeller rotor 32 extends radially between and to an inner side 68 of the impeller rotor 32 and an outer side 70 of the impeller rotor 32. The impeller rotor 32 of FIG. 2 includes an inner impeller rotor hub 72, an outer impeller rotor shroud 74 and a vane array structure 76.

The rotor hub 72 extends axially along the rotational axis 46 between and to the rotor second side 66 and a first side 78 of the rotor hub 72. The hub first side 78 of FIG. 2 axially offset (e.g., recessed) from the rotor first side 64. The hub first side 78 of FIG. 2, for example, is located axially at (e.g., on, adjacent or proximate) a second side 80 of the vane array structure 76. The rotor hub 72 extends (e.g., completely) circumferentially around the rotational axis 46 providing the rotor hub 72 with a tubular body. The rotor hub 72 extends radially between and to the rotor inner side 68 and an outer side 82 of the rotor hub 72. The rotor hub 72 forms a hub bore 84 within the impeller rotor 32. This hub bore 84 projects axially along the rotational axis 46 into the impeller rotor 32 from the rotor second side 66.

The rotor shroud 74 extends axially along the rotational axis 46 between and to the rotor first side 64 and a second side 86 of the rotor shroud 74. The shroud second side 86 of FIG. 2 is axially offset (e.g., recessed) from the rotor second side 66. A portion of the rotor shroud 74 at the shroud second side 86 may axially overlap a portion of the rotor hub 72 at the hub first side 78. The rotor shroud 74 extends (e.g., completely) circumferentially around the rotational axis 46 providing the rotor shroud 74 with a tubular body. The rotor shroud 74 extends radially between and to an inner side 87 of the rotor shroud 74 to the rotor outer side 70.

The vane array structure 76 extends axially along the rotational axis 46 between and to a first side 90 of the vane array structure 76 and the second side 80 of the vane array structure 76. The vane array structure 76 extends (e.g., completely) circumferentially around the rotational axis 46 providing the vane array structure 76 with a full-hoop body. The vane array structure 76 is arranged radially between and is connected to (e.g., formed integral with) the rotor hub 72 and the rotor shroud 74. An inner side 88 of the vane array structure 76 forms a structure bore 92 (or a counter bore to the hub bore 84) within the impeller rotor 32. This structure bore 92 projects axially along the rotational axis 46 into the impeller rotor 32 from the structure first side 90 to, for example, the hub bore 84.

The vane array structure 76 of FIG. 2 includes a plurality of impeller rotor vanes 94, an axial first structure sidewall 96 and an axial second structure sidewall 98. The rotor vanes 94 are arranged circumferentially about the rotational axis 46 in an array. This annular array of rotor vanes 94 is located radially between the rotor hub 72 and the rotor shroud 74, and axially adjacent and/or radially along the structure sidewalls 96 and 98. Each of the rotor vanes 94 of FIG. 2, for example, extends radially between and to the rotor hub 72 and the rotor shroud 74. An inner portion of each of the rotor vanes 94 extend axially along the rotational axis 46 between and to the first structure sidewall 96 and the second structure sidewall 98. The first structure sidewall 96 is disposed towards the first side 90 of the vane array structure 76. The second structure sidewall 98 is disposed towards the second side 80 of the vane array structure 76.

The impeller rotor 32 of FIG. 2 includes a plurality of inlet passages 100, a plurality of gas outlet passages 102 and a plurality of liquid outlet passages 104. The inlet passages 100 are located towards the second side 80 of the vane array structure 76. Each of these inlet passages 100 is disposed circumferentially between a circumferentially neighboring (e.g., adjacent) pair of the rotor vanes 94. Each of the inlet passages 100 projects axially along the rotational axis 46 into the impeller rotor 32 and its vane array structure 76 from the second side 80 of the vane array structure 76 to (or about) the second structure sidewall 98.

Each of the gas outlet passages 102 is disposed circumferentially between a circumferentially neighboring (e.g., adjacent) pair of the rotor vanes 94. Each of the gas outlet passages 102 is fluidly coupled with a respective one of the inlet passages 100, and follows a respective (e.g., curved) trajectory within the vane array structure 76 (axially between and radially along the structure walls 96 and 98) to a respective outlet at the inner side 88 of the vane array structure 76. The trajectory of each respective gas outlet passage 102 of FIG. 2 turns around a radial outer tip of the second structure wall 98. Each gas outlet passage 102 fluidly couples the respective inlet passage 100 to the structure bore 92.

Each of the liquid outlet passages 104 is disposed circumferentially between a circumferentially neighboring (e.g., adjacent) pair of the rotor vanes 94. Each of the liquid outlet passages 104 is fluidly coupled with a respective one of the inlet passages 100, and follows a respective (e.g., curved) trajectory within the vane array structure 76 to an outlet 106 (e.g., an annular outlet passage) at the first side 90 of the vane array structure 76. The trajectory of each respective liquid outlet passage 104 of FIG. 2 turns around a radial outer tip of the first structure wall 96. Each liquid outlet passage 104 fluidly couples the respective inlet passage 100 to the outlet 106.

With the foregoing arrangement, each respective set of passages 100, 102 and 104 forms a forked pathway within the impeller rotor 32. An inner leg of the forked pathway extends to the structure bore 92. An outer leg of the forked pathway extends to the outlet 106.

The impeller rotor 32 of FIG. 2 and its components 72, 74 and 76 are configured together as a monolithic body. The impeller rotor 32, for example, may be cast, machined, additive manufactured and/or otherwise formed as a single, unitary body. By contract, a non-unitary body is formed from a plurality of discretely formed parts which are assembled together after formation. The impeller rotor 32 is constructed from or otherwise includes impeller rotor material. This impeller rotor material may be a relatively lightweight metal such as, but not limited to, aluminum (Al) or aluminum alloy. The present disclosure, however, is not limited to the foregoing exemplary impeller rotor materials, nor to monolithic impeller rotor configurations.

Referring to FIG. 1, the shaft 34 extends axially along and is rotatable about the rotational axis 46. The shaft 34 is constructed from or otherwise includes shaft material. This shaft material be the same as or different than the impeller rotor material. The shaft material, for example, may be a relatively light-weight metal such as, but not limited to, aluminum (Al) or aluminum alloy. Alternatively, the shaft material may be a denser and/or harder metal such as, but not limited to, steel (e.g., stainless steel). The present disclosure, however, is not limited to the foregoing exemplary shaft materials.

Figure 3:
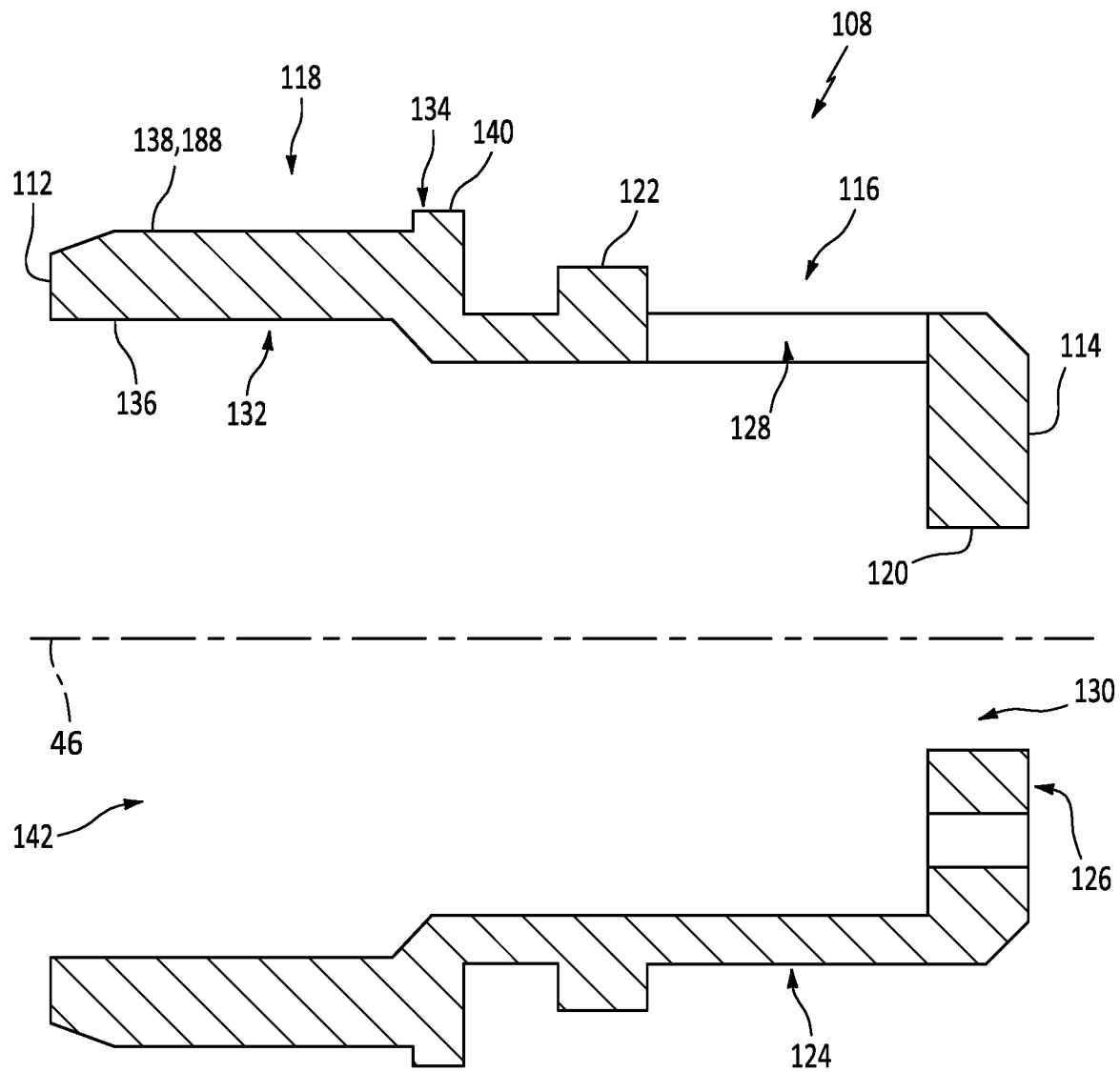
FIG. 3 is a side sectional illustration of a seal land.

The seal assembly 36 includes an impeller rotor seal land 108 (e.g., a sleeve) and a stationary seal element 110. Referring to FIG. 3, the seal land 108 extends axially along the rotational axis 46 between and to a first side 112 of the seal land 108 and a second side 114 of the seal land 108. The seal land 108 extends (e.g., completely) circumferentially around the rotational axis 46 providing the seal land 108 with a full-hoop (e.g., tubular) body. The seal land 108 of FIG. 3 includes a land mount 116 and a (e.g., tubular) land base 118.

The land mount 116 projects axially along the rotational axis 46 out from the land base 118 to the land second side 114. The land mount 116 extends radially between and to an inner side 120 of the land mount 116 and an outer side 122 of the land mount 116. The land mount 116 of FIG. 3 includes a (e.g., tubular) mount sidewall 124 and a (e.g., annular) mount endwall 126. The mount sidewall 124 of FIG. 3 is disposed at the mount outer side 122. The mount sidewall 124 extends axially along the rotational axis 46 from the land base 118 to the mount endwall 126. The mount sidewall 124 includes one or more ports 128 (one visible in FIG. 3) (e.g., apertures such as through-holes) arranged circumferentially about the rotational axis 46, where each port 128 extends radially through the mount sidewall 124. The mount endwall 126 is disposed at the land second side 114. The mount endwall 126 is connected to the mount sidewall 124, and projects radially inward to the mount inner side 120. The mount endwall 126 includes a mounting aperture 130 that extends axially through the mount endwall 126.

The land base 118 of FIG. 3 includes a (e.g., tubular) base sidewall 132 and a base locator 134 (e.g., an annular shoulder). The base sidewall 132 and, thus, the land base 118 project axially along the rotational axis 46 out from the land mount 116 to the land first side 112. The base sidewall 132 extends radially between and to an inner side 136 of the base sidewall 132 and an outer side 138 of the base sidewall 132. The base locator 134 is connected to the base sidewall 132 at, for example, an axial interface between the land base 118 and the land mount 116. The base locator 134 projects radially out from the base sidewall 132 and its outer side 138 to a distal end 140 of the base locator 134.

The seal land 108 of FIG. 3 is configured with a land bore 142. This land bore 142 is radially bounded by the base sidewall 132 and the mount sidewall 124. The land bore 142 projects axially along the rotational axis 46 into the seal land 108 from the land first side 112 to the mount endwall 126. The land bore 142 is fluidly coupled with the ports 128 (one visible in FIG. 3).

The seal land 108 of FIG. 3 and its components 116 and 118 are configured together as a monolithic body, which is discrete from the impeller rotor 32 and/or the shaft 34 (see FIG. 1). The seal land 108, for example, may be cast, machined, additive manufactured and/or otherwise formed as a single, unitary body. The seal land 108 is constructed from or otherwise includes seal land material. This seal land material may be different than the impeller rotor material. The seal land material, for example, may be a relatively dense, hard and/or abrasion resistant material such as, but not limited to, steel (e.g., stainless steel). The present disclosure, however, is not limited to the foregoing exemplary seal land materials, nor to monolithic seal land configurations.

Figure 4:
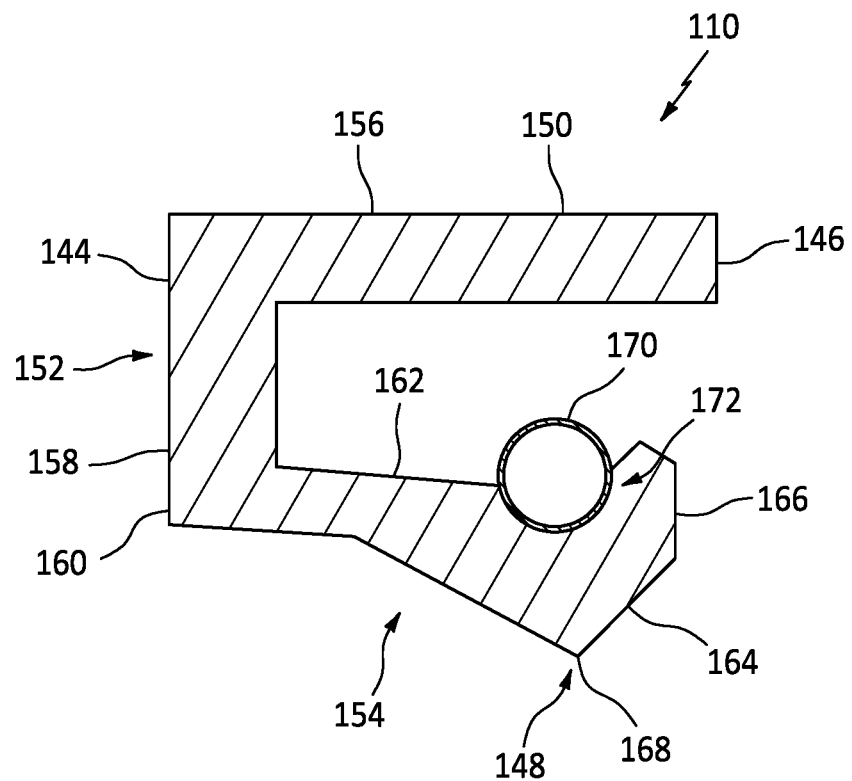
FIG. 4 is a partial side sectional illustration of a seal element.

Referring to FIG. 4, the seal element 110 extends axially along the rotational axis 46 between and to a first side 144 of the seal element 110 and a second side 146 of the seal element 110. The seal element 110 extends (e.g., completely) circumferentially around the rotational axis 46 providing the seal element 110 with a full-hoop (e.g., annular) body. The seal element 110 extends radially between an inner side 148 of the seal element 110 and an outer side 150 of the seal element 110.

The seal element 110 may be configured as a (e.g., annular) lip seal. The seal element 110 of FIG. 4, for example, includes a (e.g., annular) seal base 152 and a (e.g., tubular) seal leg 154; e.g., a flange. The seal base 152 of FIG. 4 includes an outer leg 156 and an inner leg 158. The outer leg 156 is disposed at the element outer side 150. The outer leg 156 extends axially along the rotational axis 46 between and to (or about) the element first side 144 and the element second side 146. The inner leg 158 is disposed at the element first side 144, and is connected to (e.g., formed integral with) the outer leg 156. The inner leg 158 projects radially inwards from outer leg 156 to a first end 160 of the seal leg 154. With this arrangement, the seal base 152 may have an L-shaped sectional geometry when viewed, for example, in a plane parallel with and/or coincident with the rotational axis 46; e.g., the plane of FIG. 4.

The seal leg 154 of FIG. 4 includes a (e.g., tubular) leg base 162 and a (e.g., annular) leg rim 164; e.g., a knife edge seal protrusion. The leg base 162 is disposed at the element inner side 148, and is connected to (e.g., formed integral with) and cantilevered from the inner leg 158. The leg base 162 extends axially along the rotational axis 46 between and to (or about) the element first side 144 and the element second side 146. More particularly, the leg base 162 of FIG. 4 projects axially out from the inner leg 158 and the seal leg first end 160 to a second end 166 of the seal leg 154 at the element second side 146. The leg rim 164 is disposed at (or about) the seal leg second end 166, and is connected to (e.g., formed integral with) the leg base 162. The leg rim 164 projects radially inward from the leg base 162 to a distal end tip 168; e.g., a pointed, annular edge.

The seal element 110 may also include a biasing element 170 such as, but not limited to, a gator spring. The biasing element 170 of FIG. 4 extends circumferentially about and radially engages (e.g., contacts) the seal leg 154. The biasing element 170 of FIG. 4, for example, is seated in a (e.g., annular) backside groove 172 in the seal leg 154 proximate the element second end 146. This biasing element 170 is configured to bias (e.g., push) the seal leg 154 and, thus, the leg rim 164 radially inwards.

Referring to FIG. 1, the seal land 108 is mated with the impeller rotor 32. The land mount 116, for example, is inserted into the structure bore 92 (see FIG. 2). The mount sidewall 124 may radially engage (e.g., contact) or be in close proximity to the vane array structure 76. The mount endwall 126 may axially engage (e.g., contact, abut against) an annular shoulder 174 of the impeller rotor 32. An end portion 176 of the shaft 34 may project axially through the hub bore 84 (see FIG. 2) and the mounting aperture 130 (see FIG. 3), and into the land bore 142. A coupler 178 (e.g., a nut) may be mated with the shaft end portion 176 such that (A) the mount endwall 126 is captured and clamped axially between the coupler 178 and the rotor hub 72, and (B) the rotor hub 72 is captured and clamped axially between the mount endwall 126 and an annular shoulder 180 of the shaft 34. The shaft 34 may thereby (e.g., axially) secure (e.g., mechanically fasten) the impeller rotor 32 and the seal land 108 together. At least one fastener 182 (e.g., a pin) may also be inserted into apertures (e.g., notches, recesses, etc.) in the mount endwall 126 and the rotor hub 72. The fastener 182 may thereby rotationally fix the impeller rotor 32 and the seal land 108 together. These assembled components 32, 34 and 108 form a rotating assembly for the deaerator 22, where the seal land 108 is generally located to the first side 64 of the impeller rotor 32 and the shaft 34 is generally located to the second side 66 of the impeller rotor 32.

The impeller rotor 32 (e.g., the rotor shroud 74 and/or the vane array structure 76) and the seal land 108 are arranged in the rotor cavity 38. The impeller rotor 32 (e.g., the rotor hub 72) and the shaft 34 are seated within a bore 184 of the static structure 30. The shaft 34 may be rotatably supported within the static structure 30 by at least one bearing 186; e.g., a journal bearing. The inlet passages 100 are fluidly coupled with the fluid inlet passage 40. The liquid outlet passages 104 are fluidly coupled with the liquid outlet passage 42 through the outlet 106. The gas outlet passages 102 are fluidly coupled with the gas outlet passage 44 through the ports 128 (one visible in FIG. 1) and the land bore 142.

To reduce or prevent fluid leakage between the liquid outlet passage 42 and the gas outlet passage 44, the seal element 110 is arranged within the rotor cavity 38 adjacent the seal land 108. The seal base 152, for example, is attached to the static structure 30. The seal base 152 of FIG. 1, for example, may be press-fit into a notch in the static structure 30. The seal leg 154 axially overlaps and radially engages an outer surface 188 of the seal land 108. The biasing element 170 biases the seal leg 154 against the seal land 108. The tip 168 may thereby sealingly engage (e.g., radially contact) the outer surface 188. Since the seal land 108 may be constructed from the relatively dense, durable and/or abrasion resistant seal land material as described above, the outer surface 188 may be susceptible to less wear than if the seal land 108 was made from a lightweight material such as the impeller rotor material. By contrast, since the impeller rotor 32 and/or the shaft 34 may be constructed from relative light weight materials, an overall rotating mass of the rotor assembly may be reduced.

In some embodiments, referring to FIG. 1, a ring seal element 190 (e.g., an O-ring) may be arranged between the vane array structure 76 and the land mount 116. This ring seal element 190 may form a sealed interface with and between the impeller rotor 32 and the seal land 108.

Figure 5:
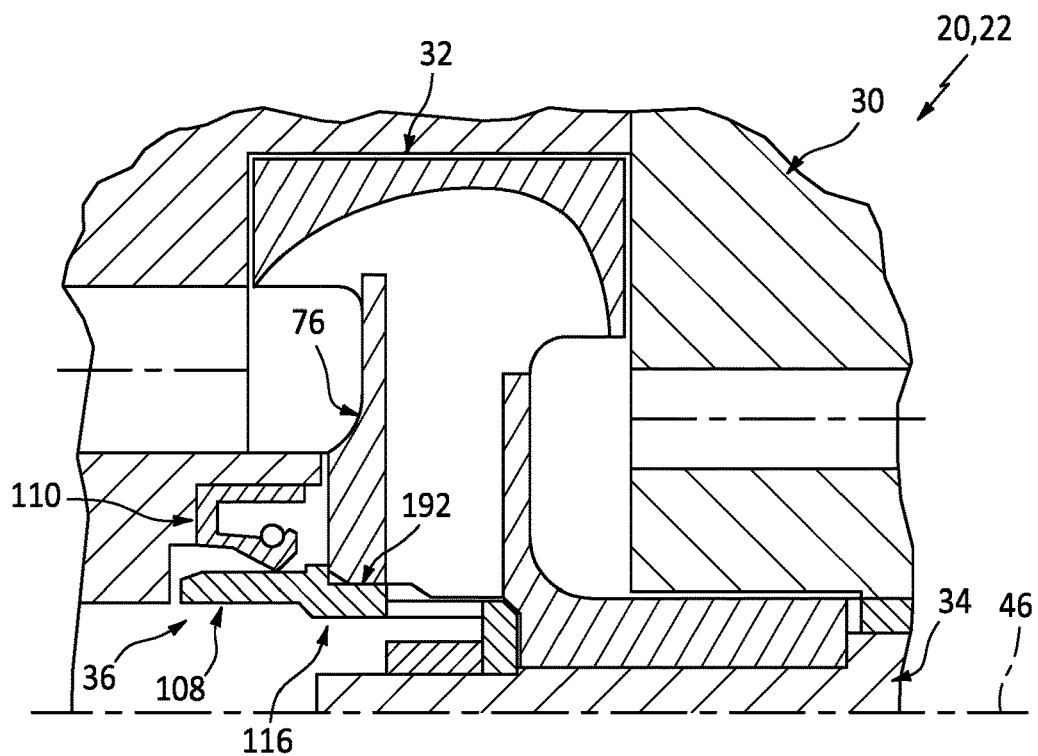
FIGS. 5-8 are side sectional illustrations of the turbine engine assembly configured with various different component configurations.

In some embodiments, referring to FIG. 5, the seal land 108 may engage the impeller rotor 32 through an interference fit 192. This interference fit 192 may provide a sealed interface between the components 76 and 116, which may replace (or included in addition to) the ring seal element 190 of FIG. 1 for example.

Figure 6:
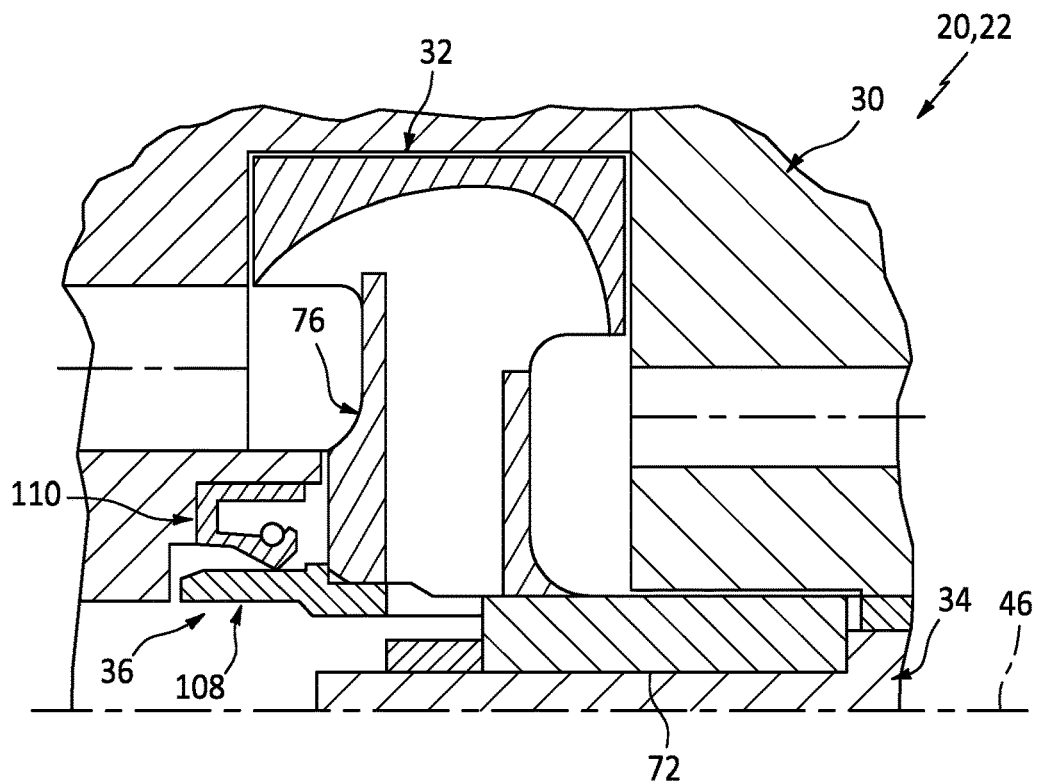

In some embodiments, referring to FIG. 6, at least (or only) the seal land 108 and the rotor hub 72 may be formed together as a monolithic body. In such embodiments, the vane array structure 76 may be attached to the monolithic body through, for example, an interference fit and/or various other types of mechanical fastening and/or bonding techniques.

Figure 7:
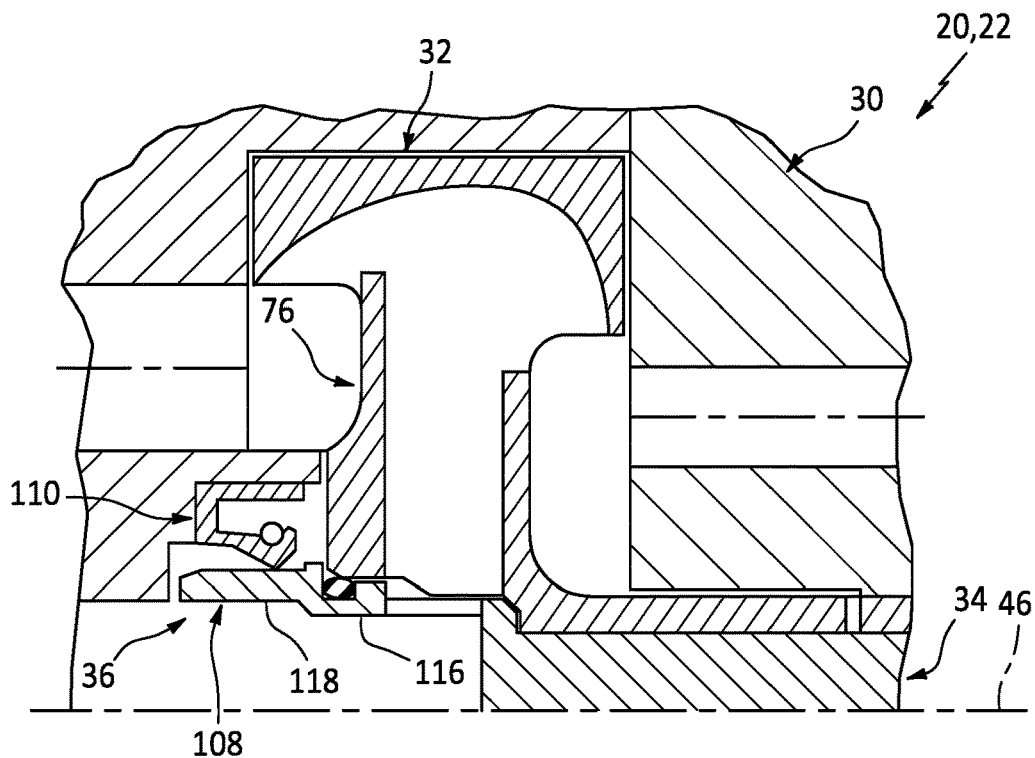

In some embodiments, referring to FIG. 7, at least (or only) the seal land 108 and the shaft 34 may be formed together as a monolithic body. In such embodiments, the impeller rotor 32 may be attached to the monolithic body through, for example, an interference fit and/or various other types of mechanical fastening and/or bonding techniques.

Figure 8:
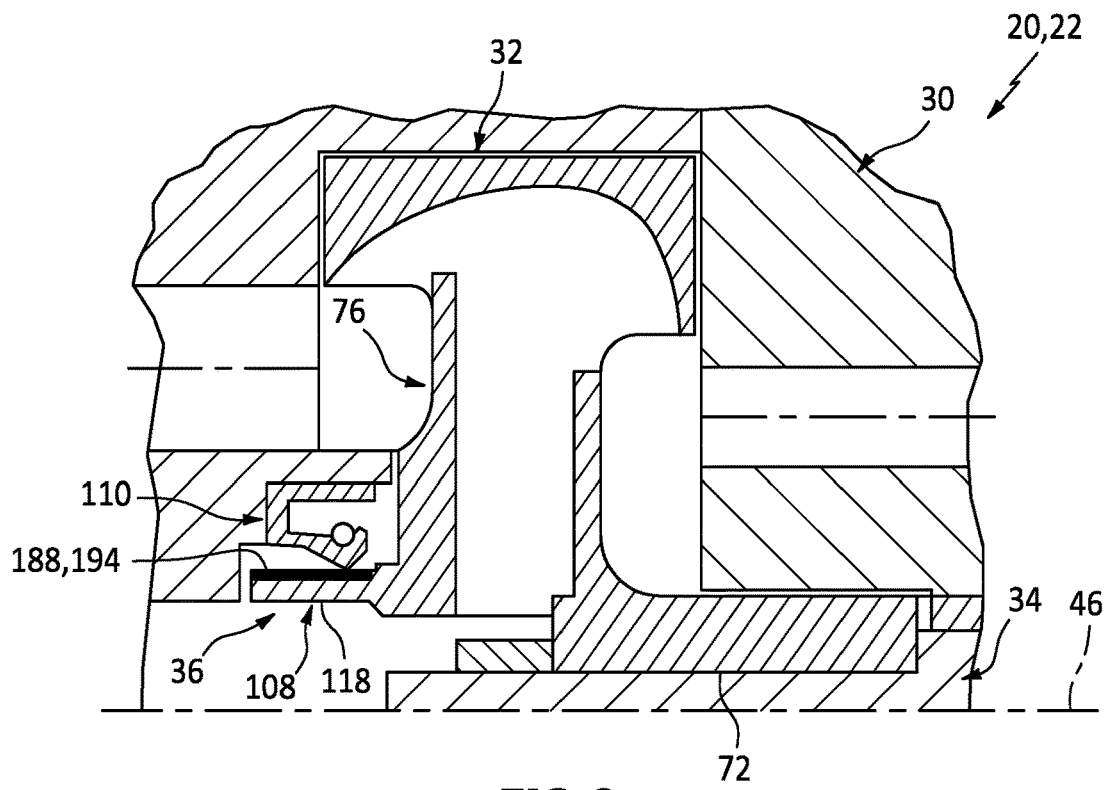

In some embodiments, referring to FIG. 8, at least (or only) the seal land 108 and the impeller rotor 32 may be formed together as a monolithic body. In such embodiments, the seal land 108 may be substantially constructed from the impeller rotor material. However, the land base 118 may be provided with a hard coating 194 to form the outer surface 188. This hard coating 194 is configured to engage with (e.g., radially contact) the seal element 110. The hard coating 194 is configured from the seal land material described above and, thus, may provide the land base 118 with a wear resistant buffer.

The turbine engine assembly 20 is described above as forming the deaerator 22. The present disclosure, however, is not limited to such an exemplary arrangement. In other examples, for example, the impeller rotor 32 may alternatively be configured as a pump impeller rotor for a fluid pump; e.g., a lubricant pump, etc.

The turbine engine assembly 20 may be included in various types of turbine engines. The turbine engine assembly 20, for example, may be included in a geared turbine engine where a gear train connects one or more shafts to one or more rotors in a fan section, a compressor section and/or any other engine section. Alternatively, the turbine engine assembly 20 may be included in a turbine engine configured without a gear train; e.g., a direct drive engine. The turbine engine assembly 20 may be included in a geared or non-geared turbine engine configured with a single spool, with two spools, or with more than two spools. The turbine engine may be configured as a turbofan engine, a turbojet engine, a turboshaft engine, a turboprop engine, a propfan engine, a pusher fan engine, an auxiliary power unit (APU) or any other type of turbine engine. The present disclosure therefore is not limited to any particular types or configurations of turbine engines. The present disclosure is also not limited to turbine engine applications. For example, the assembly 20/deaerator 22 may be configured to separate or otherwise pump fluids for other types of rotational equipment.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
an impeller rotor configured to rotate about a rotational axis, the impeller rotor comprising impeller rotor material;
a seal land extending axially along and circumferentially about the rotational axis, the seal land mechanically attached to and rotatable with the impeller rotor, and the seal land comprising seal land material that is different than the impeller rotor material; and
a lip seal radially engaging the seal land;
wherein a rotor bore extends axially along the rotational axis into the impeller rotor; and
wherein the seal land comprises a mount that projects axially along the rotational axis into the rotor bore, and the mount is mechanically attached to the impeller rotor.

2. The assembly of claim 1, wherein the impeller rotor material comprises aluminum.

3. The assembly of claim 1, wherein the seal land material comprises steel.

4. The assembly of claim 1, wherein the impeller rotor is configured as a deaerator impeller rotor.

5. The assembly of claim 1, wherein
the lip seal includes a seal base and a seal leg;
the seal leg is axially cantilevered from the seal base; and
the seal leg comprises a tip that radially contacts an outer surface of the seal land.

6. The assembly of claim 5, wherein
the lip seal further includes a biasing element extending circumferentially about and radially engaging the seal leg; and
the biasing element is configured to bias the seal leg radially inward against the outer surface of the seal land.

7. The assembly of claim 1, further comprising a ring seal element configured to form a sealed interface with and between the impeller rotor and the seal land.

8. The assembly of claim 1, wherein the seal land engages the impeller rotor through an interference fit.

9. The assembly of claim 1, wherein the mount is axially clamped to the impeller rotor.

10. The assembly of claim 1, wherein a fastener rotationally fixes the mount to the impeller rotor.

11. The assembly of claim 1, further comprising a shaft mechanically attached to and rotatable with the impeller rotor.

12. The assembly of claim 11, wherein the shaft comprises shaft material that is different than the seal land material.

13. The assembly of claim 11, further comprising:
a static structure; and
a bearing rotatably supporting the shaft within the static structure;
wherein the lip seal is fixedly secured to the static structure.

14. An assembly for a turbine engine, comprising:
an impeller rotor configured to rotate about a rotational axis, the impeller rotor comprising impeller rotor material;
a seal land extending axially along and circumferentially about the rotational axis, the seal land mechanically attached to and rotatable with the impeller rotor, and the seal land comprising seal land material that is different than the impeller rotor material;
a lip seal radially engaging the seal land; and
a shaft mechanically attached to and rotatable with the impeller rotor;
wherein the impeller rotor extends axially along the rotational axis between a first side of the impeller rotor and a second side of the impeller rotor;
wherein the seal land is arranged to the first side of the impeller rotor; and
wherein the shaft is arranged to the second side of the impeller rotor.

15. An assembly for a turbine engine, comprising:
an impeller rotor configured to rotate about a rotational axis, the impeller rotor comprising impeller rotor material;
a seal land extending axially along and circumferentially about the rotational axis, the seal land mechanically attached to and rotatable with the impeller rotor, and the seal land comprising seal land material that is different than the impeller rotor material;
a lip seal radially engaging the seal land; and
a shaft mechanically attached to and rotatable with the impeller rotor;

wherein at least the seal land and the shaft are formed together as a monolithic body.

16. An assembly for a turbine engine, comprising:

an impeller rotor configured to rotate about a rotational axis, the impeller rotor comprising impeller rotor material;

a seal land rotatable with and projecting axially along the rotational axis out from the impeller rotor, the seal land comprising seal land material that is different than the impeller rotor material; and a lip seal radially engaging the seal land material;

wherein the seal land comprises a base and a hard coating on the base;

wherein the base is formed integrally with the impeller rotor; and wherein the hard coating comprises the seal land material.

* * * * *